(12) United States Patent
Tan et al.

(10) Patent No.: US 7,849,385 B2
(45) Date of Patent: Dec. 7, 2010

(54) SYSTEMS AND METHODS FOR MEDIA DEFECT DETECTION UTILIZING CORRELATED DFIR AND LLR DATA

(75) Inventors: Weijun Tan, Longmont, CO (US); Hongwei Song, Longmont, CO (US); Shaohua Yang, Santa Clara, CA (US)

(73) Assignee: Agere Systems Inc., Allentown, PA (US)

( * ) Notice: Subject to any disclaimer, the term of this patent is extended or adjusted under 35 U.S.C. 154(b) by 312 days.

(21) Appl. No.: 12/111,255

(22) Filed: Apr. 29, 2008

(65) Prior Publication Data

US 2009/0271670 A1   Oct. 29, 2009

(51) Int. Cl.
*H03M 13/00* (2006.01)
(52) U.S. Cl. ....................................... 714/794
(58) Field of Classification Search .............. 714/755, 714/786, 794, 780
See application file for complete search history.

(56) References Cited

U.S. PATENT DOCUMENTS

| | | | |
|---|---|---|---|
| 6,065,149 A | 5/2000 | Yamanaka | |
| 6,691,263 B2 | 2/2004 | Vasic et al. | |
| 6,738,948 B2 * | 5/2004 | Dinc et al. | 714/794 |
| 6,980,382 B2 | 12/2005 | Hirano et al. | |
| 7,154,936 B2 * | 12/2006 | Bjerke et al. | 375/148 |
| 7,168,030 B2 * | 1/2007 | Ariyoshi | 714/786 |
| 7,203,015 B2 | 4/2007 | Sakai et al. | |
| 7,237,173 B2 | 6/2007 | Morita et al. | |
| 7,254,192 B2 * | 8/2007 | Onggosanusi et al. | 375/340 |
| 7,257,172 B2 | 8/2007 | Okamoto et al. | |
| 7,359,313 B2 * | 4/2008 | Chan et al. | 370/210 |
| 7,441,174 B2 * | 10/2008 | Li et al. | 714/755 |
| 7,688,915 B2 * | 3/2010 | Tanrikulu et al. | 375/316 |
| 2003/0063405 A1 | 4/2003 | Jin et al. | |
| 2007/0061687 A1 | 3/2007 | Hwang | |
| 2009/0235116 A1 | 9/2009 | Tan et al. | |
| 2009/0235146 A1 | 9/2009 | Tan et al. | |
| 2009/0268575 A1 | 10/2009 | Tan et al. | |
| 2009/0268848 A1 | 10/2009 | Tan et al. | |
| 2010/0042877 A1 | 2/2010 | Tan | |

FOREIGN PATENT DOCUMENTS

| | | |
|---|---|---|
| JP | 10-145243 | 5/1998 |
| JP | 2007-087529 | 4/2007 |

OTHER PUBLICATIONS

Kavcic et al., "A Signal-Dependent Autoregressive Channel Model", IEEE Transactions on Magnetics, vol. 35, No. 5, Sep. 1999 pp. 2316-2318.

* cited by examiner

*Primary Examiner*—James C Kerveros
(74) *Attorney, Agent, or Firm*—Hamilton, DeSanctis & Cha (57) ABSTRACT

The present invention provides systems and methods for detecting a media defect. A circuit providing a hard output and a soft output is used with the hard output and the soft output being combined and the product compared with a threshold. Based at least in part on the comparison, a media defect may be identified.

23 Claims, 7 Drawing Sheets

SYSTEMS AND METHODS FOR MEDIA DEFECT DETECTION UTILIZING CORRELATED DFIR AND LLR DATA

BACKGROUND OF THE INVENTION

The present inventions are related to systems and methods for transferring information, and more particularly to systems and methods for determining problems related to a medium associated with a data transfer.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any defects associated with the transfer medium. In some cases, data loss caused by defects in the transfer medium can make recovery of data from the transfer medium difficult even for data received from non-defective areas or times.

Various approaches have been developed for identifying defects in the transfer medium. Such approaches provide a general ability to identify defects, but in many cases are inaccurate. In the best case, this inaccuracy limits the effectiveness of any defect identification. In the worst case, inaccurate defect detection may actually hamper the data recovery process.

Hence, for at least the aforementioned reasons, there exists a need in the art for advanced systems and methods for defect detection.

BRIEF SUMMARY OF THE INVENTION

The present inventions are related to systems and methods for transferring information, and more particularly to systems and methods for determining problems related to a medium associated with a data transfer.

Various embodiments of the present invention provide methods for detecting a media defect. Such methods include deriving a data input from a medium and performing a MAP detection on the data input. The MAP detection provides an NRZ output and an LLR output corresponding to the data input. A product of the NRZ output is correlated with a product of the LLR output to produce a correlated output. The correlated output is compared with a threshold value, and a media defect output is asserted based at least in part on the result of the comparison of the correlated output with the threshold value. In particular instances of the aforementioned embodiments, the methods further include delaying the assertion of the media defect output by a defined period after the correlated output transitions to a value less than the threshold value. In some cases, the above mentioned defined period is programmable, and the above mentioned threshold value is programmable.

In some instances of the aforementioned embodiments, correlating the product of the NRZ output with the product of the LLR output includes normalizing the LLR output of the MAP detector, multiplying the normalized LLR output by the data input delayed in time to correspond to the LLR output, to create a multiplied LLR output, and squaring the NRZ output to create a squared NRZ output. The methods further include generating a ratio of the multiplied LLR output to the squared NRZ output. In such cases, generating a ratio of the multiplied LLR output to the squared NRZ output includes dividing the multiplied LLR output by the squared NRZ output. The created result is the correlated output. In some cases, the aforementioned methods further include filtering the multiplied LLR output and filtering the squared NRZ output prior to generating the ratio of the multiplied LLR output to the squared NRZ output.

In other instances of the aforementioned embodiments, correlating the product of the NRZ output with the product of the LLR output includes multiplying the LLR output by the data input delayed in time to correspond to the LLR output to create a multiplied LLR output, and multiplying the NRZ output by the data input delayed in time to correspond to the NRZ output to create a multiplied NRZ output. The methods further include generating a ratio of the multiplied LLR output to the multiplied NRZ output. In some cases, the aforementioned methods further include filtering the multiplied LLR output and filtering the multiplied NRZ output prior to generating the ratio of the multiplied LLR output to the multiplied NRZ output.

Other embodiments of the present invention provide media defect detection systems that include a MAP detector that provides an NRZ output and an LLR output based at least in part on a data signal. In addition, the systems include a correlation circuit that correlates the NRZ output with the LLR output and provides a correlated output, and a comparator that receives the correlated output and compares the correlated output with a threshold value. In some instances of the aforementioned embodiments, the systems further include a delay circuit that receives the output of the comparator and asserts a media defect flag a defined delay period after the threshold value exceeds the correlated output. In some cases, the delay circuit includes a counter that synchronously increments when the threshold value exceeds the correlated output, and synchronously resets when the correlated output exceeds the threshold value. In some cases, the aforementioned systems are implemented as part of a storage device, while in other cases, the systems are implemented as part of a communication device. Based on the disclosure provided herein, one of ordinary skill in the art will recognize other types of devices in which the systems may be implemented.

In various instances of the aforementioned embodiments, the correlation circuit includes a first multiplier and a second multiplier. The first multiplier multiples the LLR output by the data input delayed in time to correspond to the LLR output to create a multiplied LLR output, and the second multiplier multiplies the NRZ output by the data input delayed in time to correspond to the NRZ output to create a multiplied NRZ output. The systems further include a ratio generator that creates a ratio of the multiplied LLR output to the multiplied NRZ output. In some cases, the ratio of the multiplied LLR output to the squared NRZ output is the multiplied LLR output divided by the squared NRZ output.

In other instances of the aforementioned embodiments, the correlation circuit includes a normalizing circuit, a first multiplier and a second multiplier. The normalizing circuit receives the LLR output and provides a normalized LLR output. The first multiplier multiplies the normalized LLR output by the data input to create a multiplied LLR output, and the second multiplier multiplies the NRZ output by the NRZ output to create a squared NRZ output. Such systems further include a ratio generator that receives the squared NRZ output and the multiplied LLR output and produces a ratio of the multiplied LLR output to the squared NRZ output.

Yet other embodiments of the present invention provide data processing systems that include a medium, an analog signal derived from the medium, and an analog to digital converter that creates a digital signal from the analog signal. In addition, the data processing systems include a media defect detector. The media defect detector includes a MAP detector that provides an NRZ output and an LLR output based at least in part on the digital signal, and a correlation circuit that correlates the NRZ output with the LLR output and provides a correlated output. A comparator receives the correlated output and compares the correlated output with a threshold value, and a defect signal generator outputs a media defect flag based at least in part on the output of the comparator and indicating a defective portion of the medium. In one particular case, the defect signal generator includes a delay circuit that receives the output of the comparator and asserts the media defect flag a defined delay period after the threshold value exceeds the correlated output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 1b is a timing diagram of exemplary signals applied to and received from the defect detection circuit of FIG. 1a;

FIG. 2b is a timing diagram of exemplary signals applied to and received from the defect detection circuit of FIG. 2a;

DETAILED DESCRIPTION OF THE INVENTION

The present inventions are related to systems and methods for transferring information, and more particularly to systems and methods for determining problems related to a medium associated with a data transfer.

Figure 1A:
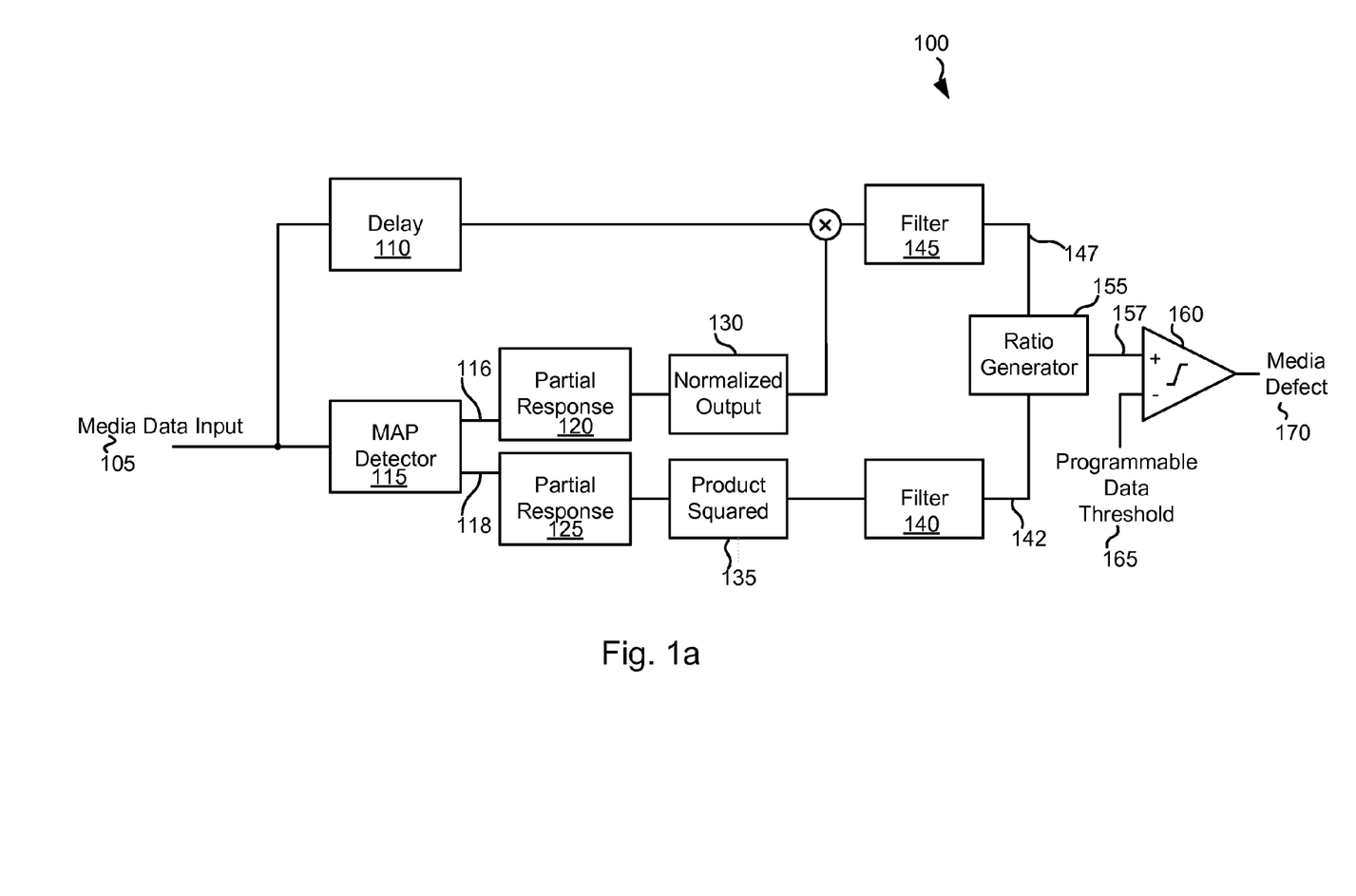
FIG. 1a depicts a correlation based defect detection system in accordance with various embodiments of the present invention.

Turning to FIG. 1a, a correlation based defect detection system 100 is depicted in accordance with various embodiments of the present invention is depicted. Correlation based defect detection system 100 includes a maximum a posteriori (MAP) data detector 115 that receives a media data input 105 and provides a soft log-likelihood ratio (LLR) output 116 and a hard output 118 (i.e., an NRZ output). MAP detector 115 may be any MAP detector known in the art, and LLR output 116 and NRZ output 118 may be done using algorithms and circuits known in the art. Each of LLR output 116 and NRZ output 118 are fed through respective partial response target circuits 120, 125 as are known in the art. This circuit regenerates $y_{ideal}$ from NRZ decisions. If all NRZ decisions are correct, then $y_{ideal}$ and y are almost the same. There may be some noise remaining in y, but not $y_{ideal}$. Said another way, in the non-defective region, $y_{ideal}$ and y are strongly correlated. In contrast, in the defective region, the correlation between $y_{ideal}$ and y is substantially reduced. The output of partial response target circuit 125 is mathematically squared using a multiplier circuit 135. The mathematically squared output is filtered using a filter circuit 140. Filter 140 may be, for example, a low pass filter that smoothes any noise evident at the output of multiplier circuit 140.

The output of partial response target circuit 120 is mathematically normalized using a normalizing circuit 130. In particular, the normalizing process operates to modify the range of the soft output 116 from MAP detector 115 to be consistent with media data input 105, and in this way operates to regenerate media data input 105. Thus, for example, regardless of the input range of media data input 105, normalizing circuit 130 causes the output from partial response circuit 120 to go from approximately negative one to positive one during non-defective portions of the media at issue. Of note, the normalization is to values obtained during non-defective regions of the media at issue. The output of normalizing circuit 130 is multiplied by media data input 105 passed through a delay block 110. Delay block 110 operates to provide a sample of media defect input 105 that is correlated in time with the output from normalized output circuit 130. The multiplied output is filtered using a filter circuit 145. Filter 145 may be, for example, a low pass filter that smoothes any noise evident at the output of multiplier circuit 145.

Filter 145 provides a correlation output 147 and filter 140 provides a reference output 142. Correlation output 147 and reference output 142 are mathematically combined using a ratio generator 155. In particular, ratio generator 155 is operable to provide a ratio output 157 (i.e., a correlated output) defined by the following equation:

Ratio Output 157=Correlation Output 147 divided by Reference Output 142.

When hard output 118 is generally correct, there will be a strong correlation between correlation output 147 and reference output 142. Alternatively, as the number of errors in hard output 118 and soft output 116 increases, the correlation between correlation output 147 and reference output 142 will generally decrease. Ratio Output 157 is compared with a programmable data threshold 165 using a comparator 160. Where the value of ratio output 157 is less than programmable data threshold 165, a media defect output 170 is asserted high. Alternatively, where the value of ratio output 157 is greater than programmable data threshold 165, media defect output 170 is de-asserted.

Figure 1B:
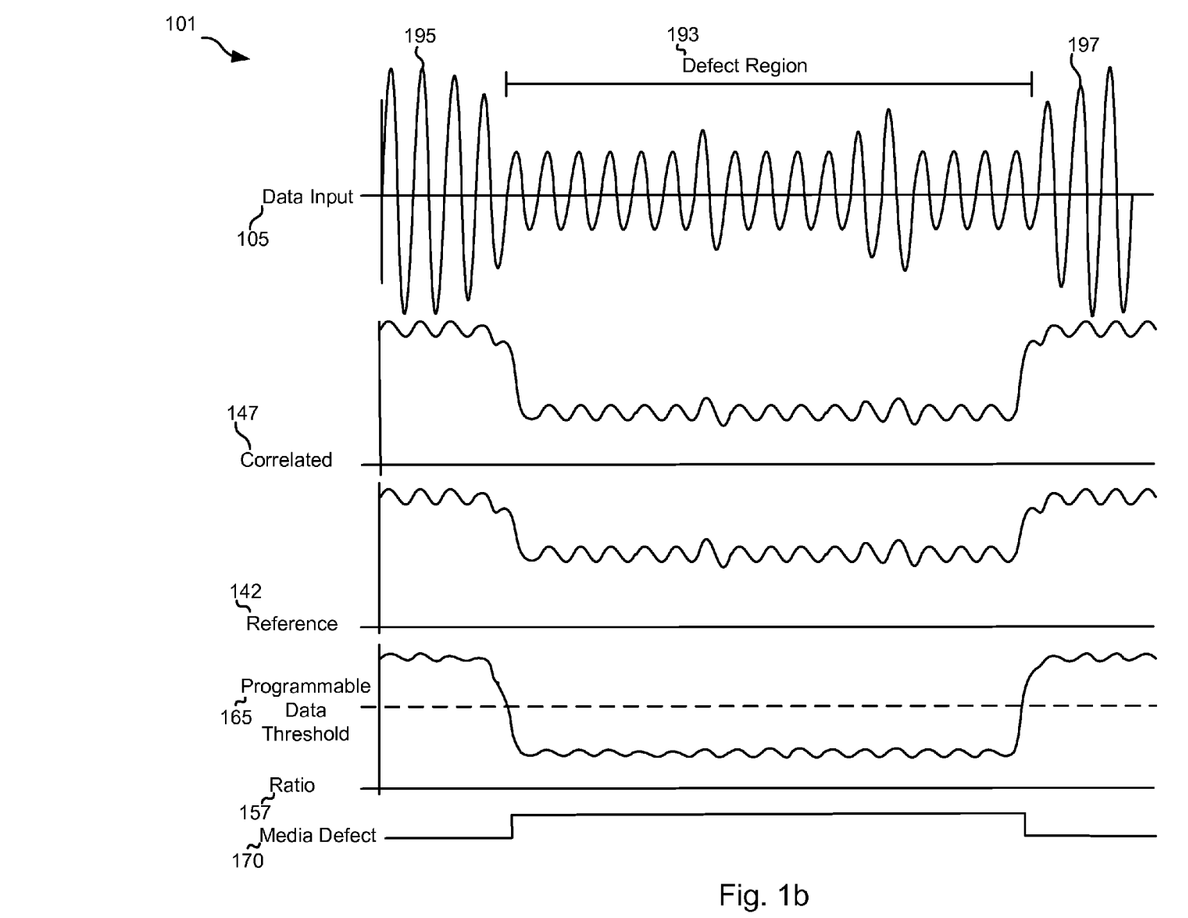

Turning to FIG. 1b, a timing diagram 101 depicts the operation of correlation based defect detection system 100 based on exemplary inputs. It should be noted that the various data inputs and outputs are merely exemplary and that circuit operation will vary depending upon the particular data inputs and system implementation. In particular, timing diagram 101 shows an exemplary data input 105 including periods where data is received from a non-defective medium 195, 197, and a period 193 where data is received from a defective medium. Of note, data from the defective portion may include a DC offset that may be eliminated through use of a filter (not shown) as will be appreciated by one of ordinary skill in the art based on the disclosure provided herein. Data from the non-defective medium (portions 195, 197) exhibits a relatively high amplitude when compared with that from the defective medium (portion 193). Timing diagram 101 also depicts correlation output 147 and reference output 142 generated based on data input 105. As shown, correlation output 147 exhibits a somewhat noisy signal operating around one DC level for non-defective regions 195, 197, and a somewhat noisy signal operating around another lower DC level for defective region 193. Similarly, reference output 142 exhibits a somewhat noisy signal operating around one DC level for non-defective regions 195, 197, and a somewhat noisy signal operating around another lower DC level for defective region 193. Of note, the DC level of reference output 142 for the defective region is greater than that for the corresponding region of correlation output 147. Again, it should be noted that timing diagram 101 is merely exemplary and that different levels of noise, DC levels and the like may be possible depending upon a particular data input 105 and system implementation. Ratio output 157 is also shown.

In part because of the strong correlation during the non-defective regions 195, 197, and the reduced correlation and lower amplitudes during the defective region 193, ratio output 142 exhibits a substantial and consistent drop-off from its highs during the non-defective regions 195, 197 to that exhibited during the defective region 193. Programmable data threshold 165 is shown as a dashed line imposed over the graph of ratio output 157. Once ratio output 157 extends below programmable data threshold 165, media defect 170 is asserted and remains asserted until ratio output 157 again exceeds programmable data threshold 165. By making programmable data threshold 165 programmable, it is possible to adjust the sensitivity of correlation based defect detection system 100.

Figure 2A:
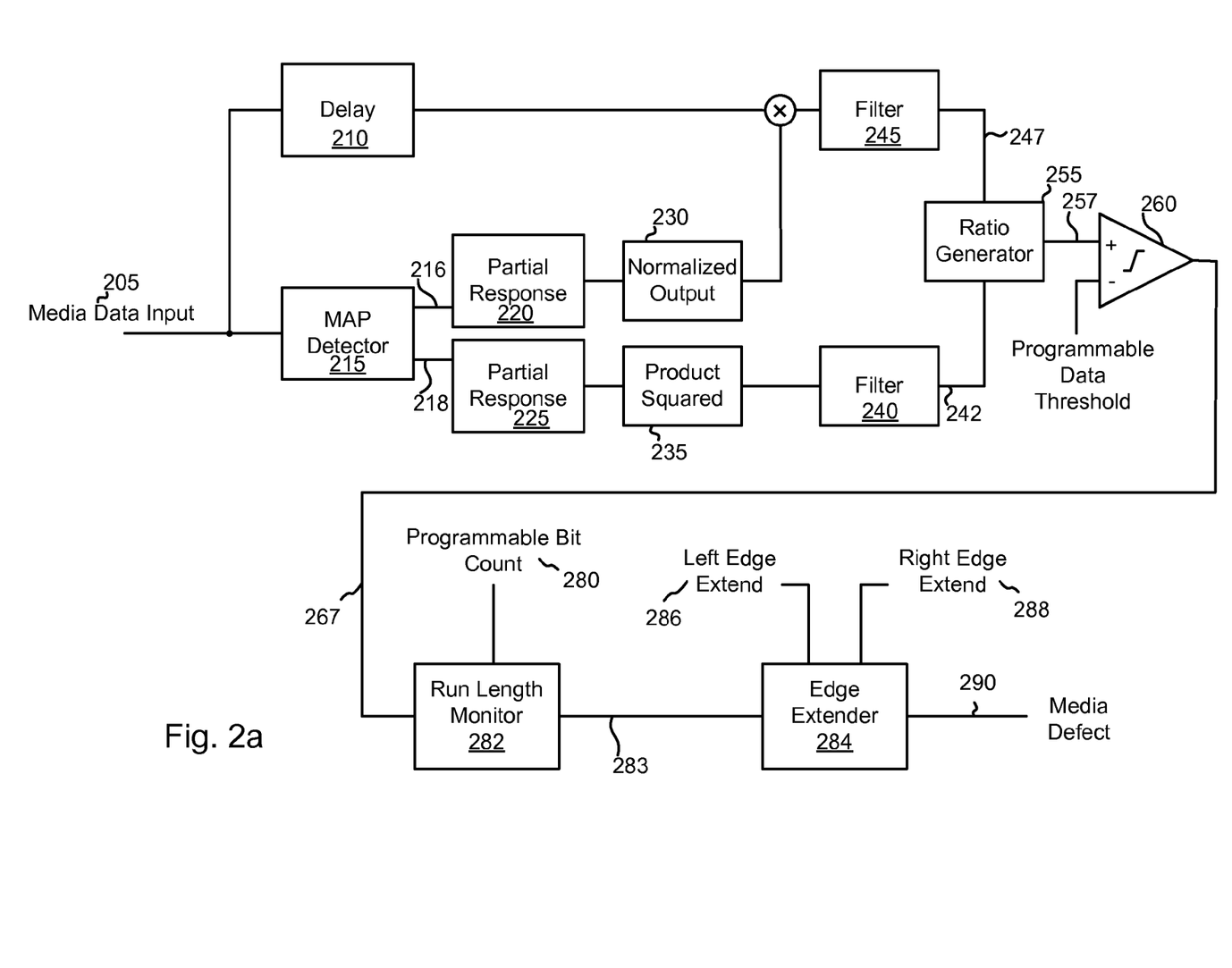
FIG. 2a a depicts another correlation based defect detection system in accordance with various embodiments of the present invention.

Turning to FIG. 2a, another correlation based defect detection system 200 is depicted in accordance with various other embodiments of the present invention is depicted. Correlation based defect detection system 200 includes a maximum a posteriori (MAP) data detector 215 that receives a media data input 205 and provides a soft log-likelihood ratio (LLR) output 216 and a hard output 218 (i.e., an NRZ output). MAP detector 215 may be any MAP detector known in the art, and LLR output 216 and NRZ output 218 may be done using algorithms and circuits known in the art. Each of LLR output 216 and NRZ output 218 are fed through respective partial response target circuits 220, 225 as are known in the art. The output of partial response target circuit 225 is mathematically squared using a multiplier circuit 235. The mathematically squared output is filtered using a filter circuit 240. Filter 240 may be, for example, a low pass filter that smoothes any noise evident at the output of multiplier circuit 240.

The output of partial response target circuit 220 is mathematically normalized using a normalizing circuit 230. In particular, the normalizing process operates to modify the range of the soft output 216 from MAP detector 215 to be consistent with media data input 205, and in this way operates to regenerate media data input 205. Thus, for example, regardless of the input range of media data input 205, normalizing circuit 230 causes the output from partial response circuit 220 to go from approximately negative one to positive one during non-defective portions of the media at issue. Of note, the normalization is to values obtained during non-defective regions of the media at issue. The output of normalizing circuit 230 is multiplied by media data input 205 passed through a delay block 210. Delay block 210 operates to provide a sample of media defect input 205 that is correlated in time with the output from normalized output circuit 230. The multiplied output is filtered using a filter circuit 245. Filter 245 may be, for example, a low pass filter that smoothes any noise evident at the output of multiplier circuit 245.

Filter 245 provides a correlation output 247 and filter 240 provides a reference output 242. Correlation output 247 and reference output 242 are mathematically combined using a ratio generator 255. In particular, ratio generator 255 is operable to provide a ratio output 257 (i.e., a correlated output) defined by the following equation:

Ratio Output 257=Correlation Output 247 divided by Reference Output 242.

When hard output 218 is generally correct, there will be a strong correlation between correlation output 247 and reference output 242. Alternatively, as the number of errors in hard output 218 increases, the correlation between correlation output 247 and reference output 242 will generally decrease. Ratio Output 257 is compared with a programmable data threshold 265 using a comparator 260. Where the value of ratio output 257 is less than programmable data threshold 265, an output of comparator 260 is asserted high. Alternatively, where the value of ratio output 257 is greater than programmable data threshold 265, comparator output 267 is de-asserted.

Comparator output 267 is provided to an assertion circuit including a run length monitor 282 and an edge extender 284. Run length monitor 282 causes an output 283 to assert whenever comparator output 267 is asserted continuously for a predefined number of cycles (i.e., a programmable bit count 280). Said another way, whenever comparator output 267 is asserted for a continuous number of cycles equivalent to programmable bit count 280, output 283 is asserted. This allows the circuit to filter out the occasional misreads or only limited defects regions. Output 283 is provided to an edge extender circuit 284 that operates to extend the assertion period of a media defect output 290. In particular, media defect output 290 is extended to the left by an amount indicated by a left edge extend input 286 and to the right by a right edge extend input 288. Extending the right and left edges allows for capture of information from the grey area surrounding a defective media region.

Figure 2B:
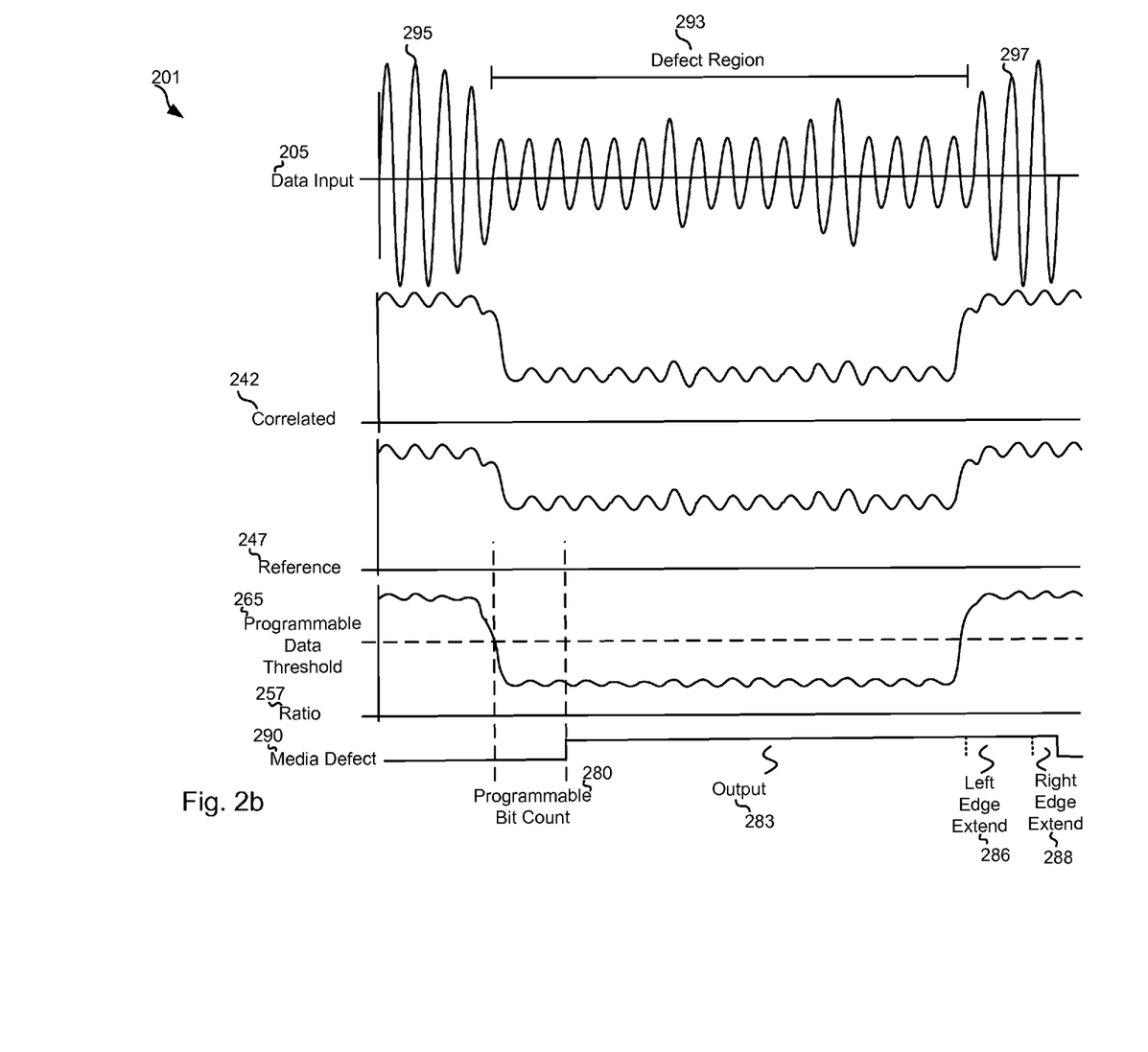

Turning to FIG. 2b, a timing diagram 201 depicts the operation of correlation based defect detection system 200 based on exemplary inputs. It should be noted that the various data inputs and outputs are merely exemplary and that circuit operation will vary depending upon the particular data inputs and system implementation. In particular, timing diagram 201 shows an exemplary data input 205 including periods where data is received from a non-defective medium 295, 297, and a period 293 where data is received from a defective medium. Of note, data from the defective portion may include a DC offset that may be eliminated through use of a filter (not shown) as will be appreciated by one of ordinary skill in the art based on the disclosure provided herein. Data from the non-defective medium (portions 295, 297) exhibits a relatively high amplitude when compared with that from the defective medium (portion 293). Timing diagram 201 also depicts correlation output 247 and reference output 242 generated based on data input 205. As shown, correlation output 247 exhibits a somewhat noisy signal operating around one DC level for non-defective regions 295, 297, and a somewhat noisy signal operating around another lower DC level for defective region 293. Similarly, reference output 242 exhibits a somewhat noisy signal operating around one DC level for non-defective regions 295, 297, and a somewhat noisy signal operating around another lower DC level for defective region 293. Of note, the DC level of reference output 142 for the defective region is greater than that for the corresponding region of correlation output 247. Again, it should be noted that timing diagram 201 is merely exemplary and that different levels of noise, DC levels and the like may be possible depending upon a particular data input 205 and system implementation. Ratio output 257 is also shown.

In part because of the strong correlation during the non-defective regions 295, 297, and the reduced correlation and lower amplitudes during the defective region 293, ratio output 242 exhibits a substantial and consistent drop-off from its highs during the non-defective regions 295, 297 to that exhibited during the defective region 293. Programmable data threshold 265 is shown as a dashed line imposed over the graph of ratio output 257. Once ratio output 257 extends below programmable data threshold 265, run length monitor 282 starts a count to determine whether to assert output 283. Once the count value exceeds that of programmable bit count 280, media defect output 290 is asserted and remains asserted until an extension region (i.e., the combination of left edge extend 286 and right edge extend 288) beyond the point where ratio output 257 again exceeds programmable data threshold 265. By waiting a period corresponding to programmable bit count 280 before asserting media defect output 290, false positives are avoided. Further, by making programmable data threshold 265 and programmable bit count 280, it is possible to adjust the sensitivity of correlation based defect detection system 200. Left edge extend 286 and right edge extend 288 allow for the period of assertion of media defect 290 to be extended to capture the period where ratio 257 first extends below programmable data threshold 265 and after ratio 257 extends above programmable data threshold 265. In some cases, left edge extend input 286 and right edge extend input 288 are each individually programmable. In some cases, left edge extend input 286 may be increased to provide a left edge extension and to compensate for the delay programmed via programmable bit count 280.

Figure 3:
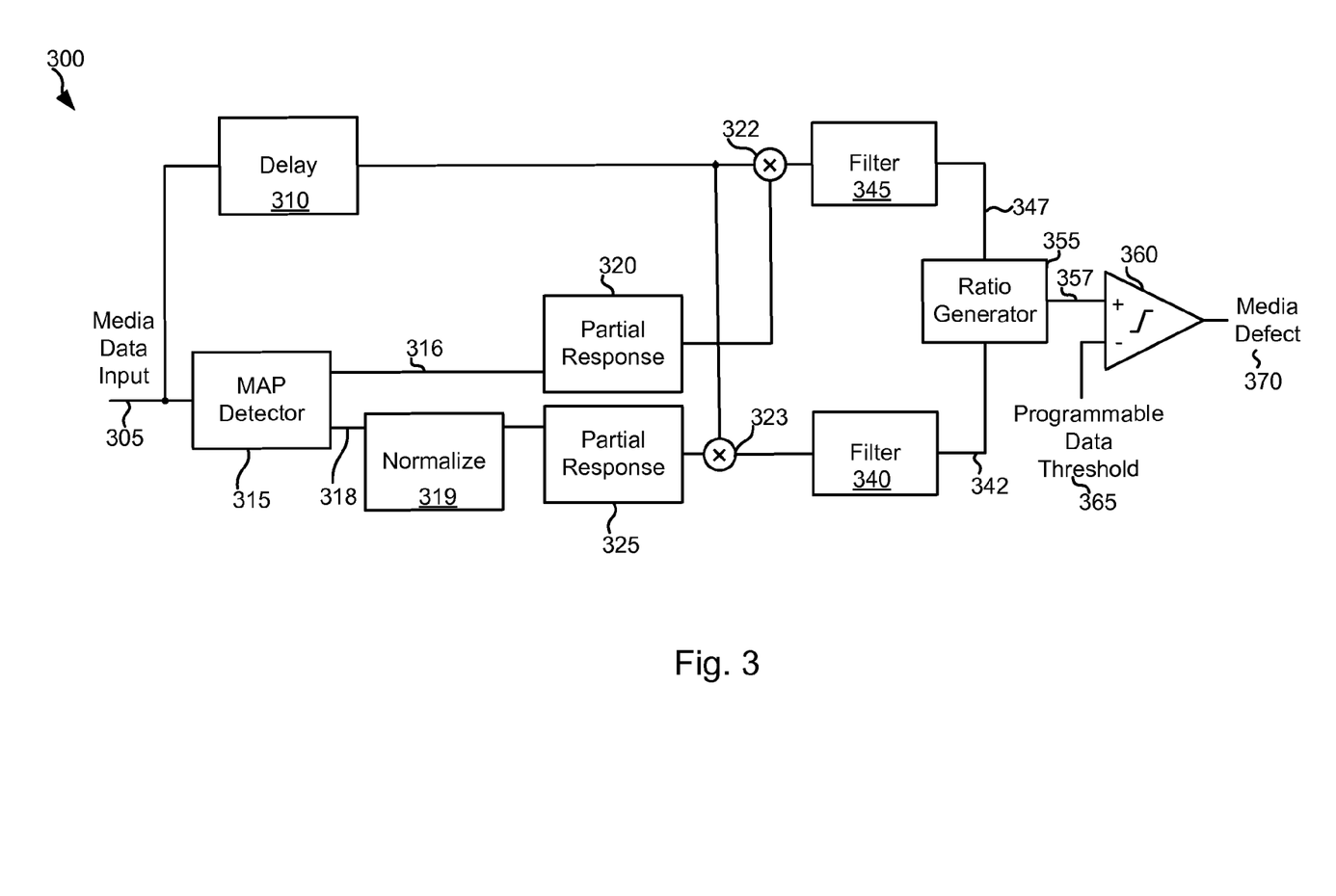
FIG. 3 shows yet another correlation based defect detection system in accordance with various embodiments of the present invention.

Turning to FIG. 3, yet another correlation based defect detection system 300 is depicted in accordance with various embodiments of the present invention. Correlation based defect detection system 300 includes a maximum a posteriori (MAP) data detector 315 that receives a media data input 305 and provides a soft log-likelihood ratio (LLR) output 316 and a hard output 318 (i.e., an NRZ output). Hard output 318 is provided to a normalize circuit 319. As an example, the output of normalize circuit 319 may go from approximately negative one to positive one during non-defective portions of the media at issue. MAP detector 315 may be any MAP detector known in the art, and LLR output 316 and NRZ output 318 may be done using algorithms and circuits known in the art. Each of LLR output 316 and NRZ output 318 are fed through respective partial response target circuits 320, 325 as are known in the art. The output of partial response target circuit 325 is multiplied by media data input 305 passed through a delay block 310 using a multiplier 323. Delay block 310 operates to provide a sample of media defect input 305 that is correlated in time with the output from MAP detector 315. The multiplied output is filtered using a filter circuit 340. Filter 340 may be, for example, a low pass filter that smoothes any noise evident at the output of multiplier 323.

Similarly, the output of partial response target circuit 320 is multiplied by media data input 305 passed through a delay block 310 using a multiplier 322. Delay block 310 operates to provide a sample of media defect input 305 that is correlated in time with the output from MAP detector 315. The multiplied output is filtered using a filter circuit 345. Filter 345 may be, for example, a low pass filter that smoothes any noise evident at the output of multiplier 322.

Filter 345 provides a correlation output 347 and filter 340 provides a reference output 342. Correlation output 347 and reference output 342 are mathematically combined using a ratio generator 355. In particular, ratio generator 355 is operable to provide a ratio output 357 (i.e., a correlated output) defined by the following equation:

Ratio Output 357=Correlation Output 347 divided by Reference Output 342.

When hard output 318 is generally correct, there will be a strong correlation between correlation output 347 and reference output 342. Alternatively, as the number of errors in hard output 318 increases, the correlation between correlation output 347 and reference output 342 will generally decrease. Ratio Output 357 is compared with a programmable data threshold 365 using a comparator 360. Where the value of ratio output 357 is less than programmable data threshold 365, a media defect output 370 is asserted high. Alternatively, where the value of ratio output 357 is greater than programmable data threshold 365, media defect output 370 is de-asserted. The outputs of correlation based defect detection system 300 are similar to those depicted in FIG. 1b above. Again, it should be noted that the timing diagram of FIG. 1b is merely exemplary and that significant changes may occur due to a change in the media data input and the particular implementation of the correlation based media defect detection system. By making programmable data threshold 165 programmable, it is possible to adjust the sensitivity of correlation based defect detection system 300.

Figure 4:
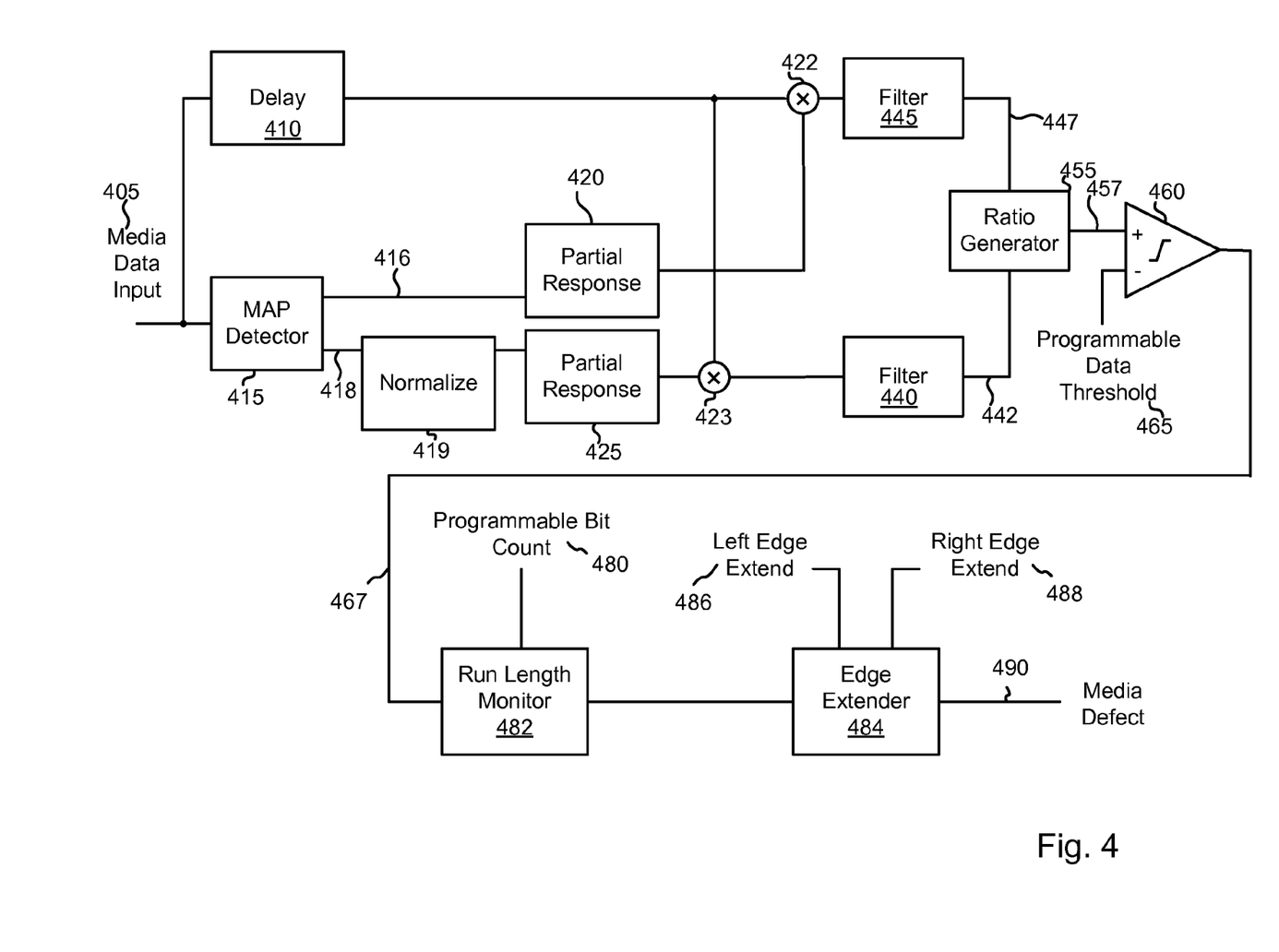
FIG. 4 shows yet another correlation based defect detection system in accordance with various embodiments of the present invention.

Turning to FIG. 4, yet another correlation based defect detection system 400 is depicted in accordance with various embodiments of the present invention. Correlation based defect detection system 400 includes a maximum a posteriori (MAP) data detector 415 that receives a media data input 405 and provides a soft log-likelihood ratio (LLR) output 416 and a hard output 418 (i.e., an NRZ output). Hard output 418 is provided to a normalize circuit 419. As an example, the output of normalize circuit 419 may go from approximately negative one to positive one during non-defective portions of the media at issue. MAP detector 415 may be any MAP detector known in the art, and LLR output 416 and NRZ output 418 may be done using algorithms and circuits known in the art. Each of LLR output 416 and NRZ output 418 are fed through respective partial response target circuits 420, 425 as are known in the art. The output of partial response target circuit 425 is multiplied by media data input 405 passed through a delay block 410 using a multiplier 423. Delay block 310 operates to provide a sample of media defect input 405 that is correlation in time with the output from MAP detector 415. The multiplied output is filtered using a filter circuit 440. Filter 440 may be, for example, a low pass filter that smoothes any noise evident at the output of multiplier 423.

Similarly, the output of partial response target circuit 420 is multiplied by media data input 405 passed through a delay block 410 using a multiplier 422. Delay block 410 operates to provide a sample of media defect input 305 that is correlated in time with the output from MAP detector 415. The multiplied output is filtered using a filter circuit 445. Filter 445 may be, for example, a low pass filter that smoothes any noise evident at the output of multiplier 422.

Filter 445 provides a correlation output 447 and filter 440 provides a reference output 442. Correlation output 447 and reference output 442 are mathematically combined using a ratio generator 455. In particular, ratio generator 455 is operable to provide a ratio output 457 (i.e., a correlated output) defined by the following equation:

Ratio Output 457=Correlation Output 447 divided by Reference Output 442.

When hard output 418 is generally correct, there will be a strong correlation between correlation output 447 and reference output 442. Alternatively, as the number of errors in hard output 418 increases, the correlation between correlation output 447 and reference output 442 will generally decrease. Ratio Output 457 is compared with a programmable data threshold 465 using a comparator 460. Where the value of ratio output 457 is less than programmable data threshold 465, an output of comparator 460 is asserted high. Alternatively, where the value of ratio output 457 is greater than programmable data threshold 465, comparator output 467 is de-asserted.

Comparator output 467 is provided to an assertion circuit including a run length monitor 482 and an edge extender 484. Run length monitor 482 causes an output 483 to assert whenever comparator output 467 is asserted continuously for a predefined number of cycles (i.e., a programmable bit count 480). Said another way, whenever comparator output 467 is asserted for a continuous number of cycles equivalent to programmable bit count 480, output 483 is asserted. This allows the circuit to filter out the occasional misreads or only limited defects regions. Output 483 is provided to an edge extender circuit 484 that operates to extend the assertion period of a media defect output 490. In particular, media defect output 490 is extended to the left by an amount indicated by a left edge extend input 486 and to the right by a right edge extend input 488. Extending the right and left edges allows for capture of information from the grey area surrounding a defective media region. The outputs of correlation based defect detection system 400 are similar to those depicted in FIG. 2b above. Again, it should be noted that the timing diagram of FIG. 2b is merely exemplary and that significant changes may occur due to a change in the media data input and the particular implementation of the correlation based media defect detection system. By waiting a period corresponding to programmable bit count 480 before asserting media defect output 490, false positives are avoided. Further, by making programmable data threshold 465 and programmable bit count 480, it is possible to adjust the sensitivity of correlation based defect detection system 400.

Figure 5:
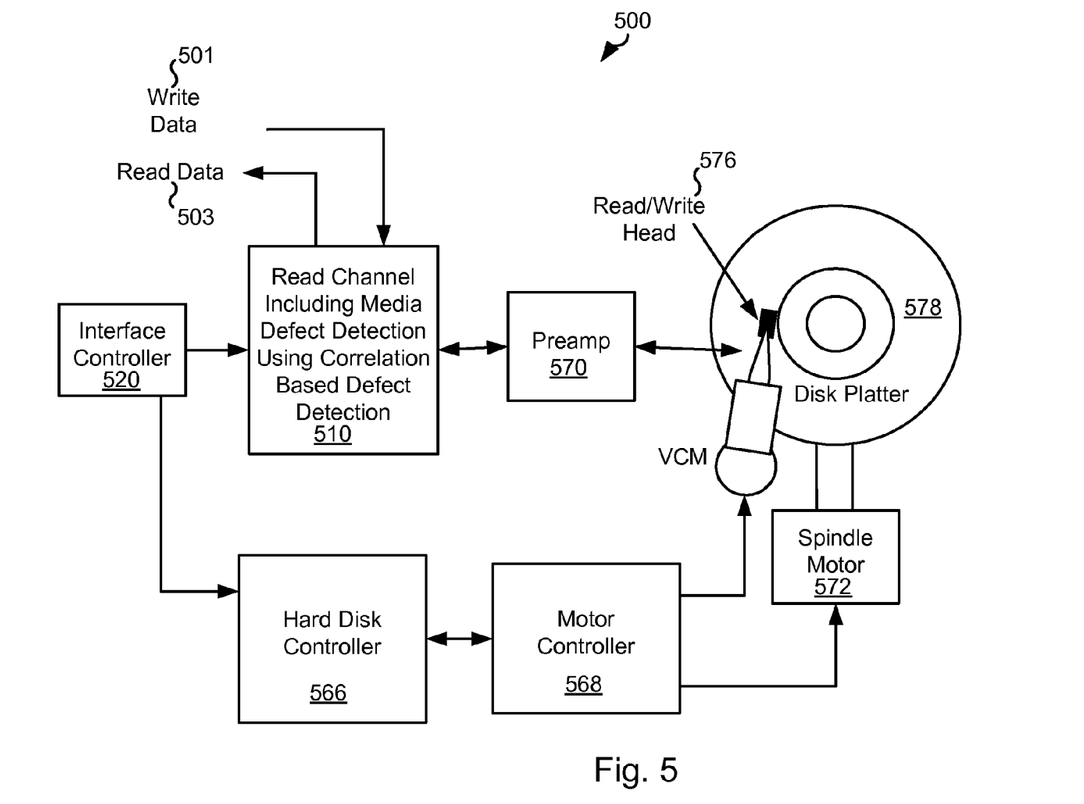
FIG. 5 depicts a storage system including a media defect system in accordance with various embodiments of the present invention.

Turning to FIG. 5, a storage system 500 including a media defect system is shown in accordance with various embodiments of the present invention. Storage system 500 may be, for example, a hard disk drive. Storage system 500 includes a read channel 510 with an incorporated media defect detector. The incorporated media defect detector may be any media defect detector capable of using a filter based approach to form a determination of a media defect. Thus, for example, the incorporated media defect detector may be, but is not limited to, any of correlation based defect detection systems 100, 200, 300, 400. In addition, storage system 500 includes an interface controller 520, a preamp 570, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs).

Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamp 570. Preamp 570 is operable to amplify the minute analog signals accessed from disk platter 578. In addition, preamp 570 is operable to amplify data from read channel module 510 that is destined to be written to disk platter 578. In turn, read channel module 510 decodes (including media defect detection) and digitizes the received analog signal to recreate the information originally written to disk platter 578. This data is provided as read data 503 to a receiving circuit. A write operation is substantially the opposite of the preceding read operation with write data 501 being provided to read channel module 510. This data is then encoded and written to disk platter 578.

Figure 6:
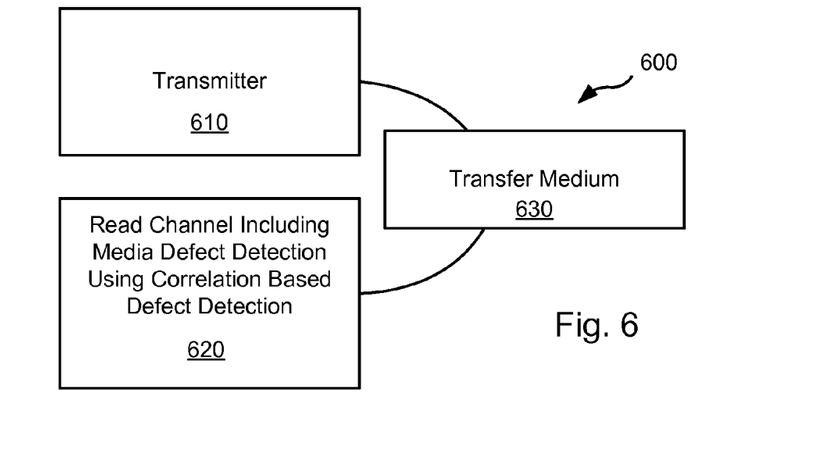
FIG. 6 depicts a communication system including a media defect system in accordance with one or more embodiments of the present invention.

Turning to FIG. 6, a communication system 600 including a receiver 620 with a media defect system in accordance with one or more embodiments of the present invention is shown. Communication system 600 includes a transmitter that is operable to transmit encoded information via a transfer medium 630 as is known in the art. The encoded data is received from transfer medium 630 by receiver 620. Receiver 620 incorporates a media defect detection circuit that is operable to determine whether a "defect" has occurred in transfer medium 630. Thus, for example, where transfer medium 620 is the Internet, it may determine that no signal is being received. Alternatively, where transfer medium 620 is the atmosphere carrying wireless signals, the media defect detection circuit may indicate a very noisy and unreliable transfer environment. Based on the disclosure provided herein, one of ordinary skill in the art will recognize a variety of mediums that may include defects and that may be utilized in relation to different embodiments of the present invention. The incorporated media defect detector may be any media defect detector capable of using soft information to form a determination of a media defect. Thus, for example, the incorporated media defect detector may be, but is not limited to, any of correlation based defect detection systems 100, 200, 300, 400.

In conclusion, the invention provides novel systems, devices, methods and arrangements for detecting media defects. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A method for detecting a media defect, the method comprising:
   deriving a data input from a medium;
   performing a maximum a posteriori detection on the data input, wherein a non-return to zero output and an log-likelihood ratio output are produced;
   correlating a product of the non-return to zero output with a product of the log-likelihood ratio output, wherein a correlated output is produced;

comparing the correlated output with a threshold value; and asserting a media defect output based at least in part on the comparison of the correlated output with the threshold value.

2. The method of claim 1, wherein correlating the product of the non-return to zero output with the product of the log-likelihood ratio output includes:

normalizing the log-likelihood ratio output of the maximum a posteriori detector;

multiplying the normalized log-likelihood ratio output by the data input delayed in time to correspond to the log-likelihood ratio output, to create a multiplied log-likelihood ratio output;

squaring the non-return to zero output to create a squared non-return to zero output; and generating a ratio of the multiplied log-likelihood ratio output to the squared non-return to zero output.

3. The method of claim 2, wherein generating a ratio of the multiplied log-likelihood ratio output to the squared log-likelihood ratio output includes:

dividing the multiplied log-likelihood ratio output by the squared non-return to zero output, wherein the result is the correlated output.

4. The method of claim 2, wherein the method further comprises:

filtering the multiplied log-likelihood ratio output and filtering the squared non-return to zero output prior to generating the ratio of the multiplied log-likelihood ratio output to the squared non-return to zero output.

5. The method of claim 1, wherein correlating the product of the non-return to zero output with the product of the log-likelihood ratio output includes:

multiplying the log-likelihood ratio output by the data input delayed in time to correspond to the log-likelihood ratio output to create a multiplied log-likelihood ratio output;

multiplying the non-return to zero output by the data input delayed in time to correspond to the non-return to zero output to create a multiplied non-return to zero output; and generating a ratio of the multiplied log-likelihood ratio output to the multiplied non-return to zero output.

6. The method of claim 5, wherein generating a ratio of the multiplied log-likelihood ratio output to the squared log-likelihood ratio output includes:

dividing the multiplied log-likelihood ratio output by the multiplied non-return to zero output, wherein the result is the correlated output.

7. The method of claim 5, wherein the method further comprises:

filtering the multiplied log-likelihood ratio output and filtering the multiplied non-return to zero output prior to generating the ratio of the multiplied log-likelihood ratio output to the multiplied non-return to zero output.

8. The method of claim 1, wherein the method further comprises:

delaying the assertion of the media defect output by a defined period after the correlated output transitions to a value less than the threshold value.

9. The method of claim 8, wherein the defined period is programmable.

10. The method of claim 1, wherein the threshold value is programmable.

11. A media defect detection system, wherein the media defect detection system comprises:

a data signal;

a maximum a posteriori detector, wherein the maximum a posteriori detector provides an non-return to zero output and an log-likelihood ratio output based at least in part on the data signal;

a correlation circuit, wherein the correlation circuit correlates the non-return to zero output with the log-likelihood ratio output and provides a correlated output; and a comparator, wherein the comparator receives the correlated output and compares the correlated output with a threshold value.

12. The media defect detection system of claim 11, wherein the correlation circuit includes:

a first multiplier, wherein the first multiplier multiples the log-likelihood ratio output by the data input delayed in time to correspond to the log-likelihood ratio output to create a multiplied log-likelihood ratio output;

a second multiplier, wherein the second multiplier multiplies the non-return to zero output by the data input delayed in time to correspond to the non-return to zero output to create a multiplied non-return to zero output; and a ratio generator, wherein the ratio generator creates a ratio of the multiplied log-likelihood ratio output to the multiplied non-return to zero output.

13. The media defect detection system of claim 12, wherein the ratio of the multiplied log-likelihood ratio output to the squared log-likelihood ratio output is the multiplied log-likelihood ratio output divided by the squared non-return to zero output.

14. The media defect detection system of claim 11, wherein the correlation circuit includes:

a normalizing circuit, wherein the normalizing circuit receives the log-likelihood ratio output and provides a normalized log-likelihood ratio output;

a first multiplier, wherein the first multiplier multiplies the normalized log-likelihood ratio output by the data input to create a multiplied log-likelihood ratio output;

a second multiplier, wherein the second multiplier multiplies the non-return to zero output by the non-return to zero output to create a squared non-return to zero output; and a ratio generator, wherein the ratio generator receives the squared non-return to zero output and the multiplied log-likelihood ratio output and produces a ratio of the multiplied log-likelihood ratio output to the squared non-return to zero output.

15. The media defect detection system of claim 14, wherein the ratio of the multiplied log-likelihood ratio output to the squared log-likelihood ratio output is the multiplied log-likelihood ratio output divided by the squared non-return to zero output.

16. The media defect system of claim 11, wherein the media defect system is implemented as part of a device selected from a group consisting of: a storage device and a communication device.

17. The media defect system of claim 11, wherein the system further comprises:

a delay circuit, wherein the delay circuit receives the output of the comparator and asserts a media defect flag a defined delay period after the threshold value exceeds the correlated output.

18. The media defect system of claim 17, wherein the delay circuit includes:

a counter that synchronously increments when the threshold value exceeds the correlated output, and synchronously resets when the correlated output exceeds the threshold value.

19. A data processing system, the data processing system comprising:
   a medium;
   an analog signal derived from the medium;
   an analog to digital converter, wherein the analog to digital converter creates a digital signal from the analog signal;
   a media defect detector, wherein the media defect detector includes:
      a maximum a posteriori, wherein the maximum a posteriori detector provides a non-return to zero output and an log-likelihood ratio output based at least in part on the digital signal;
   a correlation circuit, wherein the correlation circuit correlates the non-return to zero output with the log-likelihood ratio output and provides a correlated output; and
   a comparator, wherein the comparator receives the correlated output and compares the correlated output with a threshold value, and
   a defect signal generator, wherein the defect signal generator outputs a media defect flag based at least in part on the output of the comparator and indicating a defective portion of the medium.

20. The data processing system of claim 19, wherein the defect signal generator includes a delay circuit, and wherein the delay circuit receives the output of the comparator and asserts the media defect flag a defined delay period after the threshold value exceeds the correlated output.

21. A method for detecting a media defect, the method comprising:
   receiving a data input from a medium;
   performing a data detection on the data input, wherein a hard output and a soft output are provided by one data processing circuit;
   correlating a product of the hard output with a product of the soft output to yield a correlated output;
   comparing the correlated output with a threshold value; and
   asserting a media defect output based at least in part on the comparison of the correlated output with the threshold value.

22. The method of claim 21, wherein the hard output is a non-return to zero output, and wherein the soft output is a log-likelihood ratio output.

23. A media defect detection system, wherein the media defect detection system comprises:
   a data signal;
   a detector circuit operable to provide both a hard output and a soft output based at least in part on the data signal;
   a correlation circuit, wherein the correlation circuit is operable to correlate the hard output with the soft output to yield a correlated output; and
   a comparator, wherein the comparator is operable to receive the correlated output and to compare the correlated output with a threshold value.

* * * * *